United States Patent Office 3,372,178
Patented Mar. 5, 1968

3,372,178
ARYL-VINYL CONTAINING LINEAR DI-
SILOXANES AND TRI- AND TETRA-
CYCLOSILOXANES
Tse C. Wu, Waterford, N.Y., assignor to General Electric
Company, a corporation of New York
No Drawing. Filed Mar. 4, 1965, Ser. No. 437,282
10 Claims. (Cl. 260—448.2)

This application relates to cyclopolysiloxanes useful in the formation of organosiloxane polymers and to compositions of matter for preparing these cyclopolysiloxanes. More particularly, this application relates to cyclopolysiloxanes having a silicon-bonded triarylsiloxy group in addition to a group attached to the same silicon atom which allows cross-linking of the ultimately formed polymer and to certain triarylsiloxysilanes.

It is known that polysiloxanes of high phenyl content exhibit both high strength and thermal stability, particularly as compared with, for example, methylpolysiloxanes. It is further known that the mechanical strength of polymeric materials can be improved by reducing the slippage between adjacent polymer chains. Further, because of the high stability of organopolysiloxanes of high phenyl content, it is known that these materials are difficult to cross-link. Thus, a valuable polymer is formed by the incorporation of both bulky units along the chain of a high phenyl content siloxane polymer and the incorporation of units which allow cross-linking of the polymer. In my copending application Ser. No. 299,204, filed Aug. 1, 1963, now Patent No. 3,234,180, and assigned to the same assignee as the present invention, a variety of polymers meeting these criteria were disclosed and claimed. These polymers have the generic structure:

(1)
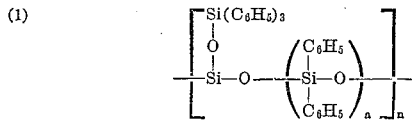

where $a$ is a whole number equal to from 0 to 2, inclusive, and $n$ has a value in excess of 1, e.g., from 40 to 50, or more.

Cyclic organopolysiloxanes have been found particularly valuable in the formation of organopolysiloxanes, especially long-chain polymers. Exemplary of these long-chain polymer raw materials which have proven invaluable are octamethylcyclotetrasiloxane and hexaphenylcyclotrisiloxane. In general, the preferred method of forming long-chain organosiloxanes is by polymerization of such cyclic material. Thus, a cyclic intermediate for the formation of the polymers described in my aforementioned copending application would be extremely valuable. I have now found suitable compounds for the formation of the polymer described by Formula 1 where $a$ is 2 and, additionally, a similar cyclopolysiloxane where the silicon-bonded hydrogen is replaced by a silicon-bonded vinyl group so as to allow cross-linking directly between these materials substituted with triarylsiloxy groups. Further, cyclopolysiloxanes formable into the polymers described by Formula 1, where some of the phenyl groups are replaced by other aryl groups, have also been found.

Briefly, the present invention relates to cyclopolysiloxanes having the formula:

(2)
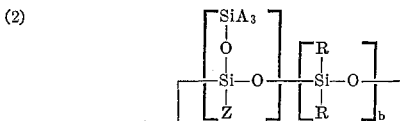

where A is an aryl grop, R is an aryl group which can be the same as or different from A, Z is a member selected from the class consisting of H and vinyl, and $b$ is an integral number of from 2 to 3, inclusive. Among the aryl groups which A can represent are phenyl, ortho-tolyl, meta-tolyl, para-tolyl, ortho-trifluoromethylphenyl, meta-trifluoromethylphenyl, and para - trifluoromethylphenyl. Among the aryl groups which R can represent are those just described for A and, in addition, cyanaphenyl, benzoylphenyl, para-phenoxyphenyl, xylyl, ethylphenyl, naphthyl, biphenyl, etc.

Additionally, this invention relates to certain triarylsiloxychlorosilanes utilized in forming the cyclotrisiloxanes of Formula 2. These triarylsiloxysilanes include:

(3) $(C_6H_5)_3SiOSiViCl_2$ (4)
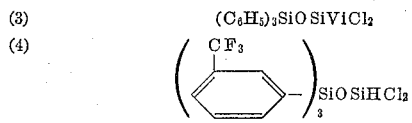

and (5) $(m-T)_3SiOSiHCl_2$ where m-T is the meta-tolyl group and Vi is the vinyl group.

The cyclopolysiloxanes of the present invention are formed by the reaction of a triorganosiloxysilane having the formula:

(6) $A_3SiOSiZCl_2$ and a symmetrical polysiloxanediol, in the presence of a solvent and an acid acceptor, according to the equation.

(7)
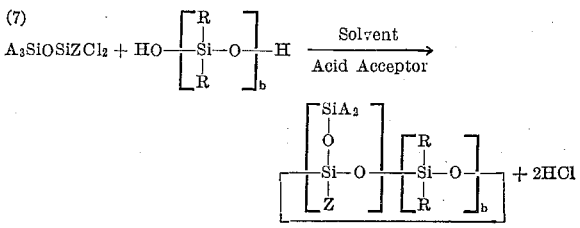

where A, R, Z, and $b$ are as previously defined.

Included among the solvents which can be utilized for the reaction are essentially any organic materials which are inert to the reactants under the conditions of reaction. However, the preferred solvents are the hydrocarbons such as benzene, toluene, xylene, pentane, hexane, heptane, etc. Polar solvents such as ethers and ketones are usable, but are not preferred. The polar solvents tend to keep the acid acceptor-hydrogen chloride salts formed in the reaction in solution. Any of the utilizable solvents can be mixed, that is, one solvent can be used for one of the reactants and a different solvent for the other reactants.

Preferably, the two reactants are added to a reaction vessel simultaneously, each being contained in a solvent medium. However, if desired, the disiloxane of Formula 6 can be added to a solvent solution of the polysiloxanediol. Since a cyclic polysiloxane is to be formed, the conditions of reaction should favor the formation of such a compound. In general, the more dilute the solution, the more the formation of a cyclic is favored. Thus, the final concentration should be no more than about 2 moles of total reactant per liter of solvent, and preferably no more than about 0.5 mole of total reactant per liter of solvent.

The product of the present invention can be formed with the two reactants shown in Equation 7 in a stoichiometric ratio of 1:1, or a 50% excess, based on the stoichiometric ratio, or either of the reactants can be employed.

Among the acid acceptors which can be utilized are the tertiary amines, including pyridine, picoline, 1,4-diazabicyclo(2,2,2)octane, and the dialkyl anilines. These acid acceptors absorb generated hydrogen chloride in a molar ratio of 1:1. Since one mole of hydrogen chloride is generated for each mole of reactant, there must be at least one mole of acid acceptor for each mole of reactant. Preferably, the acid acceptor is present in an amount at least 50% in excess of the stoichiometric requirement, and can be present in an excess of several hundred percent.

The reaction can be conducted at any temperature from about 10° C. to the boiling point of the reaction mixture. Preferably, the reaction is conducted at from about room temperature to about 50° C. A temperature close to ambient is especially preferred both for convenience and because the reaction is accomplished rapidly, even at such a temperature. The maximum of 50° C. is preferred as above this temperature there is a greater tendency to form straight-chain polymers as opposed to the desired cyclopolysiloxanes.

The reactants should be added over a period of from about 30 minutes to 3 hours, to aid in assuring the formation of the desired cyclics. This relatively slow addition rate prevents the concentration of reactants from rising beyond a desirable level and thus maintains the dilute solution which promotes the formation of cyclics. Preferably, the reaction mixture is stirred for at least 30 minutes following the addition to assure completion of the reaction.

Following completion of the reaction, the reaction mixture is filterer to remove the acid acceptor-hydrogen chloride salts. The solvent is then evaporated and the resultant compound is further purified either by recrystallization from hydrocarbon solvents such as pentane, petroluem ether, hexane, and cyclohexane, or from other suitable organic solvents such as ethyl acetate and acetonitrile.

The formation of the cyclopolysiloxanes and intermediates of the present invention will now be described in greater detail. These examples should be considered as illustrative only, and not as limiting in any way the full scope of the invention as covered in the appended claims.

In several of the following examples, tolyl-substituted polysiloxanediols are utilized. The preparation of these materials will be illustrated by the preparation of sym-tetra-m-tolyldisiloxanediol. All parts in this illustration are by weight. A solution containing 500 parts of ether, 120 parts of sodium bicarbonate, and a small quantity of water were placed in a reaction vessel. To the vessel was added a second solution containing 126.8 parts of sym-dichlorotetra-m-tolyldisiloxane in 250 parts of ether, over a period of 1.5 hours. The resulting slurry was stirred at room temperature for 18 hours, filtered, and the filtate placed in a flash evaporator to remove the solvent. A 95% yield of crude product melting at 60°–68° C. was obtained. The crude product was recrystallized twice from petroleum ether and gave a material having the formula:

(8)
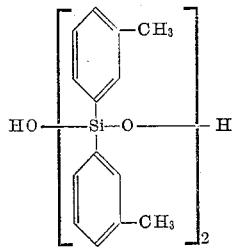

which had a melting point of 68.5°–69.5° C. By a similar procedure, hexa-p-tolyltrisiloxane-1,5-diol was prepared and had a melting point of 139°–141° C. The structure of these tolyl-substituted polysiloxanediols was substantiated by infrared analysis.

Example 1

This example deals with the preparation of the triphenylsiloxydichlorosilane, corresponding to Formula 3 where A is phenyl, and Z is hydrogen, which is used as an intermediate in the preparation of a triphenylsiloxy-substituted cyclotrisiloxane. All parts are by weight. A mixture containing 240 parts of triphenylsilanol, 149 parts of trichlorosilane, and 875 parts of dry benzene was refluxed for 6 hours while a stream of nitrogen was bubbled through to remove the generated hydrogen chloride. Following the refluxing period, the solvent was distilled off and the residue subsequently distilled under a vacuum. A quantity of 274.8 parts (84% based on the theoretical) of triphenylsiloxydichlorosilane having the formula:

(9) $\qquad$ $(C_6H_5)_3SiOSiHCl_2$ was obtained, boiling at 168°–170° C. at 0.6 mm. This material solidified to shiny crystals which were found to have a melting point of 36° C.

Example 2

The triphenylsiloxydichlorosilane produced in Example 1 was utilized here to form 1-triphenylsiloxy-3,3,5,5-tetraphenylcyclotrisiloxane. Into a reaction vessel were placed 50 ml. (0.6 mole) of pyridine and 500 ml. of benzene. Two 500 ml. solutions were prepared, the first containing 75.1 g. of the product of Example 1 in benzene, and the second containing 82.9 g. of sym-tetraphenyldisiloxanediol in benzene. The pyridine-benzene mixture was stirred and to it were added, simultaneously at about the same rate, the two reactant solutions, over a period of about 2.5 hours. The resultant slurry was stirred for an additional 30 minutes following the addition at room temperature. The slurry was then filtered, the filtrate distilled to remove the benzene solvent, and the residue evacuated at a temperature of 50° C. to remove excess pyridine. The resultant material was recrystallized once from toluene, twice from cyclohexane, and finally from a 4:1 mixture of petroleum ether and benzene to yield 33.2 g. (23% based on the theoretical) of the product having the formula:

(10)
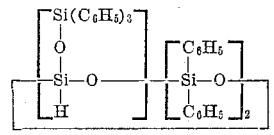

which had a melting point of 143.5°–145° C. The structure of this material was substantiated by infrared analysis.

Example 3

In this example the disiloxane of Example 1 is again utilized, here to form 1-triphenylsiloxy-3,3,5,5,7,7-hexa-p-tolylcyclotetrasiloxane. Into a reaction vessel are placed 98 ml. (1.0 mole) of 2-picoline and 300 ml. of toluene. Two 300 ml. solutions are prepared, the first containing 37.5 g. (0.1 mole) of triphenylsiloxydichlorosilane in toluene and the second containing 104.4 g. (0.15 mole) of hexa-p-tolyltrisiloxane-1,5-diol in toluene. The picoline-toluene mixture is stirred and to it are added the two solutions, simultaneously at about the same rate, over a period of about 1.5 hours. The resulting slurry is stirred for an additional hour, is then filtered, the toluene distilled from the mixture, and the residue recrystalliezd several times from toluene. There results from these crystallizations a material having the formula:

(11)
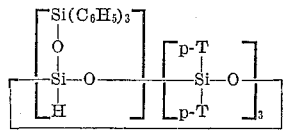

where p-T is the para-tolyl group.

Example 4

The composition of matter corresponding to Formula 3, triphenylsiloxyvinyldichlorosilane, was prepared in this example for subsequent use in preparing cyclotrisiloxanes. All parts in this example are by weight. Into a reaction vessel were placed 55 parts of vinyltrichlorosilane and 175 parts of tetrahydrofuran. To the trichlorosilane-tetrahydrofuran mixture was added, dropwise, a solution containing 69.1 parts of triphenylsilanol, 19.5 parts of pyridine, and 175 parts of tetrahydrofuran. During the addition, which took place over a period of about 2 hours, heat was evolved and a large amount of precipitate formed. Following the addition, the reaction mixture was allowed to stand at room temperature and was then filtered, using suction, to remove the precipitate which had formed. The filtrate was distilled to remove the tetrahydrofuran. The residue was vacuum distilled and resulted in a clear, colorless material boiling at 160° C. at 10 microns. The yield from the distillation was 86 parts (85.7% based on the theoretical) of material having the structure:

$$(C_6H_5)_3SiOSIViCl_2$$

where Vi is the vinyl group. The structure of this material was substantiated by an infrared spectrum. In addition, the material was tested for hydrolyzable chlorine, and found to have 17.95%, corresponding very favorably with the theoretical value of 17.67%.

*Example 5*

The triphenylsiloxyvinyldichlorosilane produced in Example 4 was utilized here to form 1-triphenylsiloxy-1-vinyl-3,3,5,5-tetraphenylcyclotrisiloxane. Into a reaction vessel were placed 15 g. (0.2 mole) of pyridine and 200 ml. of diethyl ether. Two 110 ml. solutions were prepared, the first containing 20 g. (0.05 mole) of the triphenylsiloxyvinyldichlorosilane in diethyl ether and the second containing 20.7 g. (0.05 mole) of sym-tetraphenyldisiloxanediol, also in diethyl ether. The pyridine-ether mixture was stirred and to it were added the two solutions, simultaneously at about the same rate, over a period of about 30 minutes. The resulting reaction mixture was stirred for an additional 2 hours at room temperature. The mixture was then filtered, using suction, and the filtrate distilled to remove the ether solvent. The residue was washed with toluene and recrystallized successively from n-hexane and ethanol. A quantity of 13.1 g. (35% based on the theoretical) of crystals having the formula:

(12) 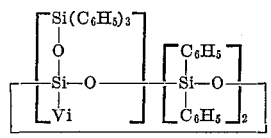

were recovered. These crystals had a melting point of 122°–124° C. and their structure was substantiated by an infrared spectrum.

*Example 6*

The silane formed in Example 4 is again utilized, this time to form 1-triphenylsiloxy-1-vinyl-3,3,5,5-tetra-m-tolylcyclotrisiloxane. Into a reaction vessel are placed 120 ml. (0.75 mole) of N,N-diethylaniline and 250 ml. of toluene. Two 250 ml. solutions are prepared, the first containing 60 g. (0.15 mole) of triphenylsiloxyvinyldichlorosilane in diethyl ether, and the second containing 47 g. (0.1 mole) of sym-tetra-m-tolyldisiloxanediol in toluene. The aniline-toluene solution is stirred and to it are added, simultaneously at about the same rate, the two reactant solutions over a period of about 90 minutes. The resulting mixture is stirred for an additional hour at room temperature and is then filtered to remove the aniline-hydrochloride salts. The filtrate is distilled to remove the solvent and the residue is recrystallized from cyclohexane to yield the product having the formula:

(13) 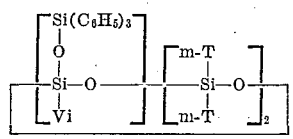

where m-T is the meta-tolyl group.

*Example 7*

A silane containing a tris(m-trifluoromethylphenyl) siloxy group, the material of Formula 4 was prepared for formation of a cyclopolysiloxane. All parts are by weight. Into a reaction vessel were placed 265 parts of dry benzene, 24 parts of tris(m-trifluoromethylphenyl)silanol, and 8.8 parts of trichlorosilane. The reaction mixture was heated to reflux, with stirring, for a period of 6 hours, while nitrogen was bubbled through. The reaction mixture was cooled and placed in a flash evaporator to remove the solvent. The resulting residue was vacuum distilled to give 18.7 g. (65% based on the theoretical) of material boiling at 170°–175° C. at 0.04 mm. and having the formula:

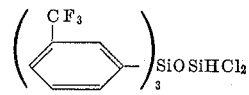

The material was tested to determine the hydrolyzable chlorine content and was found to have 12.05 percent, corresponding very well with the theoretical percentage of 12.23. The structure was also substantiated by an infrared analysis.

*Example 8*

The tris(m-trifluoromethylphenyl)siloxydichlorosilane produced in Example 7 was utilized here to prepare a triarylsiloxy-substituted cyclotrisiloxane. Into a reaction vessel were placed 250 ml. of benzene and 8 ml. (0.1 mole) of pyridine. Two 250 ml. solutions were prepared, the first containing 16.3 g. (0.03 mole) of tris(m-trifluoromethylphenyl)siloxydichlorosilane in benzene and the second containing 11.6 g. (0.03 mole) of sym-tetraphenyldisiloxanediol, also in benzene. The benzene-pyridine mixture was stirred and the two solutions were added to it, simultaneously at about the same rate, over a period of about one hour. Following the addition, stirring was continued for an additional 6 hours after which the solids which had formed were filtered from the reaction mixture. The solvent was removed from the filtrate by distillation and the residue was washed successively with toluene and methanol. The resulting solids were recrystallized twice from pentane and yielded 8.6 g. (33% based on the theoretical) of crystals melting at 102°–105.5° C. and having the formula:

(14) 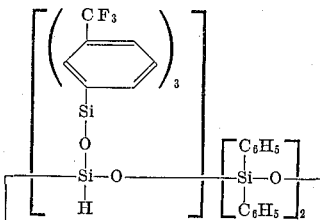

The structure of this product was substantiated by an infrared spectrum which showed, inter alia, bands at 9.8 microns, indicative of the cyclotrisiloxane structure, at 4.5 microns, indicative of the Si—H bond, and at 7.55, 8.55, 9.3, and 12.4 microns, indicative of the carbon-fluorine bonds.

*Example 9*

In this example, the tri-m-tolysiloxy-containing silane of Formula 5 was prepared. All parts are by weight. Into a reaction vessel were placed 44.5 parts of tri-m-tolylsilanol, 23.7 parts of trichlorosilane, and 340 parts of dry benzene. This mixture was stirred and heated at reflux for 9 hours while a stream of nitrogen was bubbled through to remove the generated hydrogen chloride. The mixture was then cooled and placed in a flash evaporator to remove the benzene solvent and the resulting residue was vacuum distilled to yield 44.2 parts (74% based on the theoretical) of material boiling at about 175° C. at 0.02 mm. and having the structure:

$$(m\text{-}T)_3SiOSiHCl_2$$

where m-T is the meta-tolyl group. The structure of this material was substantiated by a hydrolyzable chlorine analysis which showed 16.65% and 16.97%, in two checks, comparing very favorably with the theoretical value of 16.99%, and by an infrared analysis.

*Example 10*

In this example, the silane produced in Example 9 was utilized to form the corresponding cyclotrisiloxane. Into a reaction vessel were placed 300 ml. of benzene and 13 ml. (0.16 mole) of pyridine. Two 300 ml. solutions were prepared, the first containing 21.6 g. (0.05 mole) of tri-m-tolylsiloxydichlorosilane in benzene and the second containing 21.4 g. (0.05 mole) of sym-tetraphenyldisiloxanediol, also in benzene. The pyridine-benzene mixture was stirred and the two solution were added simultaneously at about the same rate, over a period of 1 hour and 15 minutes. The reaction mixture was stirred for an additional 6.5 hours following the addition, after which the pyridine hydrochloride salts which had formed were filtered from the mixture. The filtrate was placed in a flash evaporator to remove the benzene solvent, the residue extracted with toluene, the toluene evaporated, and the resulting residue vacuum distilled at 0.02 mm. The distillate was recrystallized three times from petroleum ether and yielded 5 g. (13% based on the theoretical) of dense crystals with a melting point of 92°–93° C., which had the structure:

(15)
$$\begin{bmatrix} (m\text{-}T)_3 \\ | \\ Si \\ | \\ O \\ | \\ -Si-O- \\ | \\ H \end{bmatrix} \begin{bmatrix} C_6H_5 \\ | \\ -Si-O- \\ | \\ C_6H_5 \end{bmatrix}_2$$

where m-T is the meta-tolyl group.

A quantity of the cyclotrisiloxane formed in Example 2 was placed in a reaction vessel and heated in a 160° C. oil bath until the cyclic compound became molten. A quantity of a potassium hydroxide suspension, equivalent to about 20 p.p.m. of KOH based on the cyclic, was added and in about 30 seconds the liquid began to thicken. Heating was discontinued after about 2 minutes and the polymer gradually cooled to a solid. An infrared spectrum of this solid material substantiated that it was equivalent to the polymer of Formula 1 where $a$ was 2. Similarly, the cyclic compound formed in Example 5 was polymerized at 150° C. with about 40 p.p.m. of equivalent potassium hydroxide and an infrared spectrum substantiated the structure:

(16)
$$\begin{bmatrix} \begin{bmatrix} Si(C_6H_5)_3 \\ | \\ O \\ | \\ -Si-O- \\ | \\ Vi \end{bmatrix} \begin{pmatrix} C_6H_5 \\ | \\ -Si-O- \\ | \\ C_6H_5 \end{pmatrix}_2 \end{bmatrix}_n$$

where $n$ was a whole number greater than 1.

Thus, a valuable intermediate for the formation of the polymers described in my aforementioned copending application has been found. Not only are a greater variety of aryl substituents available with the cyclopolysiloxanes of the present invention, as compared with the polymer described in my aforementioned copending application but, in addition, the vinyl analog of the hydrogen-substituted polymer, as shown in Formula 16, has been formed. This allows either the cross-linking of a polymer such as that shown in Formula 1 with a vinyl-containing polymer which is the same as, or similar to, that shown in Formula 16 and, additionally, allows the cross-linking of a polymer of the type of Formula 16 with other organopolysiloxanes having Si—H groups.

The specific formulations and methods of formation just described should not be considered as limiting in any way the full scope of the invention as covered in the appended claims.

What I claim as new and desire to secure by Letters Patent of the United States is:

1. A cyclopolysiloxane having the formula:

$$\begin{bmatrix} SiA_3 \\ | \\ O \\ | \\ -Si-O- \\ | \\ Z \end{bmatrix} \begin{bmatrix} R \\ | \\ -Si-O- \\ | \\ R \end{bmatrix}_b$$

where A is an aryl radical, R is an aryl radical, Z is selected from the class consisting of hydrogen and vinyl groups, and $b$ is an integral number of from 2 to 3, inclusive.

2. The cyclopolysiloxane:

$$\begin{bmatrix} Si(C_6H_5)_3 \\ | \\ O \\ | \\ -Si-O- \\ | \\ H \end{bmatrix} \begin{bmatrix} C_6H_5 \\ | \\ -Si-O- \\ | \\ C_6H_5 \end{bmatrix}_2$$

3. The cyclopolysiloxane:

$$\begin{bmatrix} Si(C_6H_5)_3 \\ | \\ O \\ | \\ -Si-O- \\ | \\ H \end{bmatrix} \begin{bmatrix} p\text{-}T \\ | \\ -Si-O- \\ | \\ p\text{-}T \end{bmatrix}_3$$

where p-T is the para-tolyl group.

4. The cyclopolysiloxane:

$$\begin{bmatrix} Si(C_6H_5)_3 \\ | \\ O \\ | \\ -Si-O- \\ | \\ Vi \end{bmatrix} \begin{bmatrix} C_6H_5 \\ | \\ -Si-O- \\ | \\ C_6H_5 \end{bmatrix}_2$$

where Vi is the vinyl group.

5. The cyclopolysiloxane:

$$\begin{bmatrix} Si(C_6H_5)_3 \\ | \\ O \\ | \\ -Si-O- \\ | \\ Vi \end{bmatrix} \begin{bmatrix} m\text{-}T \\ | \\ -Si-O- \\ | \\ m\text{-}T \end{bmatrix}_2$$

where Vi is the vinyl group and m-T is the meta-tolyl group.

6. The cyclopolysiloxane:

$$\begin{bmatrix} \left(\bigcirc\!\!-CF_3\right)_3 \\ | \\ Si \\ | \\ O \\ | \\ -Si-O- \\ | \\ H \end{bmatrix} \begin{bmatrix} C_6H_5 \\ | \\ -Si-O- \\ | \\ C_6H_5 \end{bmatrix}_2$$

7. The cyclopolysiloxane:

$$\begin{bmatrix} (m\text{-}T)_3 \\ | \\ Si \\ | \\ O \\ | \\ -Si-O- \\ | \\ H \end{bmatrix}_2 \begin{bmatrix} C_6H_5 \\ | \\ -Si-O- \\ | \\ C_6H_5 \end{bmatrix}_2$$

8. The triarylsiloxysilane:

$$(C_6H_5)_3SiOSiViCl_2$$

9. The triarylsiloxysilane:
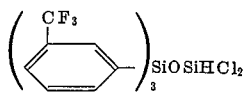
10. The triarylsiloxysilane:
where m-T is the meta-tolyl group.
References Cited
UNITED STATES PATENTS
| | | | |
|---|---|---|---|
| 3,234,180 | 2/1966 | Wu | 260—448.2 XR |
| 3,328,245 | 6/1967 | Sporck | 260—448.2 XR |
| 3,310,526 | 3/1967 | Sporck | 260—448.2 XR |
TOBIAS E. LEVOW, *Primary Examiner.*
P. F. SHAVER, *Assistant Examiner.*